J. Culver,
Hydrant,
No. 828.
Reissued Sep. 27, 1859.
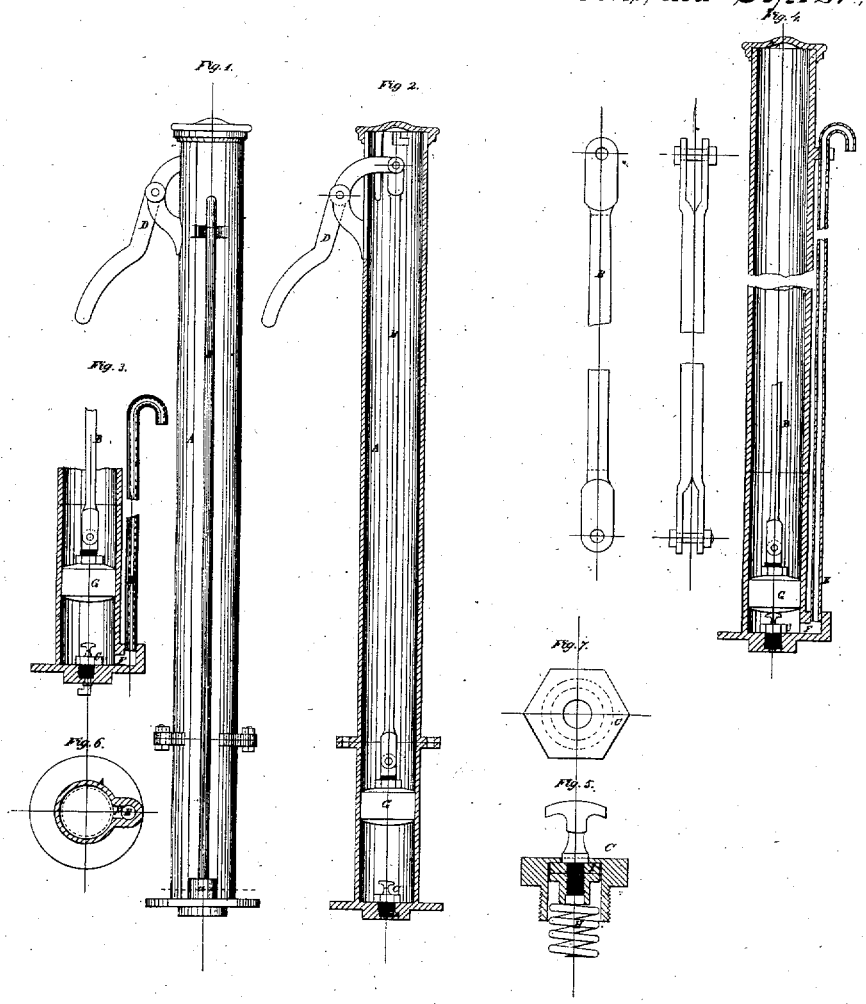
N. PETERS, PHOTO-LITHOGRAPHER, WASHINGTON, D. C.

UNITED STATES PATENT OFFICE.

JOSHUA REGESTER, WILLIAM G. WEBB, JOHN L. ROCHE, AND JOHN McCART, ASSIGNEES OF JOHN CULVER, ALL OF BALTIMORE, MARYLAND.

IMPROVED WASTE DEVICE FOR HYDRANTS.

Specification forming part of Letters Patent No. 14,712, dated April 22, 1856; Reissue No. 828, dated September 27, 1859.

*To all whom it may concern:*

Be it known that we, the aforesaid assignees of the Improved Waste Device for Hydrants and Fire-Plugs, for which Letters Patent of the United States were granted to JOHN CULVER, of Baltimore city and State of Maryland, dated the 22d day of April, 1856, do hereby declare the following to be a full, clear, and exact description of the construction and operation of the same as originally invented by the said JOHN CULVER, reference being had to the annexed drawings, forming part of this specification, in which—

Figure 1 is an elevation of hydrant, showing discharge-pipe. Fig. 2 is an elevational section. Fig. 3 is a sectional view of lower part, showing plunger elevated. Fig. 4 is a sectional view with plunger down. Fig. 5 is a full size view of valve. Fig. 6 is a cross-section through A, Fig. 1; and Fig. 7 is a top view of valve.

Similar letters of reference denote the same parts on the several figures.

The object of this invention is the construction of hydrants so that they shall not be rendered inoperative by the freezing of water within them, and that no water shall remain in or be afterward forced into the discharge-pipe after being once shut off. The plunger is so arranged relative to the discharge-pipe that on the rising of the plunger a chamber will be formed in the lower portion of the hydrant for the reception of the water left in the pipe, which chamber will by the construction of the hydrant be below the surface of the ground sufficiently far to prevent freezing.

A is the body of the hydrant; B, the connecting-rod of plunger. G is the plunger operated by lever D. E is the discharge-pipe communicating with A by chamber F. C is the valve governing entrance of water; H, a spiral spring, and I packing so that it shall fit snug to its seat. This valve is screwed into the bottom of the hydrant, and can be readily removed for repairs. The elevation of long arm of lever D depresses the plunger upon valve C, admitting water to the hydrant, which is discharged, as shown in Fig. 4. The elevating of the plunger to position shown on Fig. 3 causes spring H to act upon valve C and force the packing I close to its seat, and thus cut off a further supply. Without this spring the pressure of the water would in some cases be insufficient to close the valve, and where there are two or more hydrants near each other the operating one of them will effect the valve C of the others, on the principle of the hydraulic ram, unless furnished with some auxiliary power to keep it close to the seat, preventing the filling of the discharge-pipe again. The water left in the discharge-pipe flows back into the chamber formed by elevating the plunger, and there remains beyond the reach of the frost, as described. The rise of the plunger is just sufficient to give the requisite capacity of chamber for the contents of the discharge pipe.

What we claim as of the aforesaid JOHN CULVER'S invention, and of which we have become the owners by assignments duly recorded in the Patent Office, is—

1. The described arrangement of the plunger relative to the discharge-pipe, and capable of elevation proportional to the capacity of said pipe, for forming a chamber in the lower portion of the hydrant for the reception of the contents of the discharge-pipe.

2. In combination, the arrangement of the valve C, and means for operating it, by the spring H, substantially as and for the purposes specified.

JOSHUA REGESTER.
WILLIAM GEO. WEBB.
JOHN L. ROCHE.
JOHN McCART.

Witnesses:
WM. M. KINLEY,
LOUIS A. JAMONT.